United States Patent [19]
Woods et al.

[11] Patent Number: 6,036,261
[45] Date of Patent: Mar. 14, 2000

[54] VEHICULAR CHILD SEAT COVER

[76] Inventors: Alison Woods; Ines S. Kratt, both of 3577 Marshall St., Riverside, Calif. 92504

[21] Appl. No.: 09/199,245

[22] Filed: Nov. 25, 1998

[51] Int. Cl.[7] ......................................... A47C 7/62
[52] U.S. Cl. ...................... 297/184.13; 297/224; 297/487
[58] Field of Search .................................. 297/487, 184.1, 297/184.13, 184.14, 184.15, 184.17, 219.12, 224, 228.11; 5/482, 414, 416

[56] References Cited

U.S. PATENT DOCUMENTS

| | | | |
|---|---|---|---|
| 4,785,838 | 11/1988 | Negahdari | 297/184.13 X |
| 4,810,030 | 3/1989 | Lewis | 297/184.13 X |
| 4,946,221 | 8/1990 | Livingston | 297/224 X |
| 5,474,329 | 12/1995 | Wade et al. | 297/228.11 X |
| 5,522,639 | 6/1996 | Jaime | 297/184.13 |
| 5,795,020 | 8/1998 | Sirico | 297/487 X |

*Primary Examiner*—Laurie K. Cranmer

[57] ABSTRACT

A vehicular child seat cover is provided including a cover and a plurality of rods each coupled to the cover for maintaining the same in an erected orientation. The cover defines an enclosed space adapted for housing a vehicular child seat therein.

15 Claims, 2 Drawing Sheets

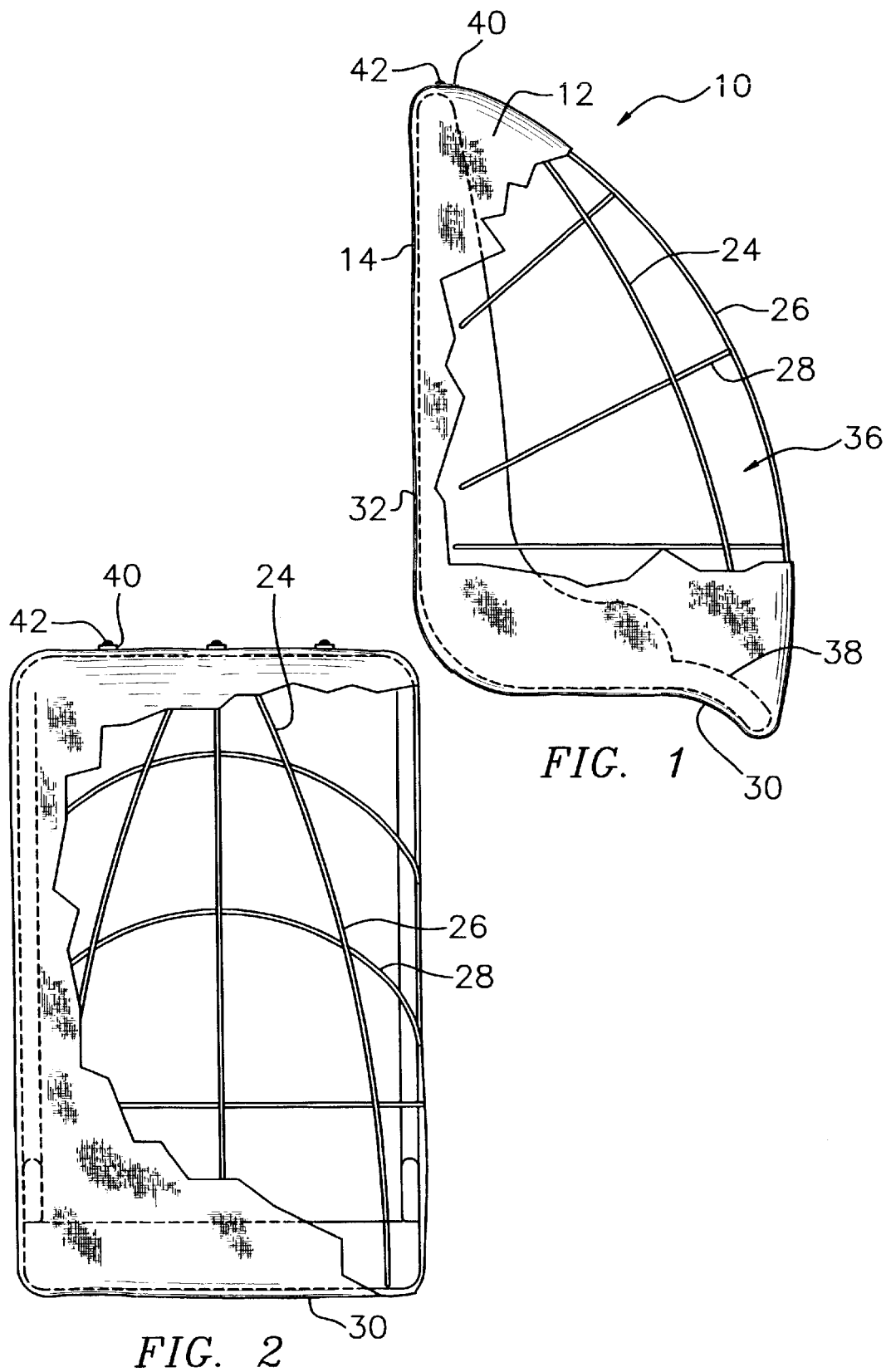

VEHICULAR CHILD SEAT COVER

BACKGROUND OF THE INVENTION

1. Field of the Invention

The present invention relates to vehicular child seats and more particularly pertains to a new vehicular child seat cover for maintaining an area surrounding a vehicular child seat at a constant desired temperature.

2. Description of the Prior Art

The use of vehicular child seats is known in the prior art. More specifically, vehicular child seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,978,166; U.S. Pat. No. 4,314,727; U.S. Pat. No. 5,662,379; U.S. Pat. No. 2,533,527; U.S. Pat. No. Des. 347,915; and U.S. Pat. No. 4,027,915.

In these respects, the vehicular child seat cover according to the present invention substantially departs from the conventional concepts and designs of the prior art, and in so doing provides an apparatus primarily developed for the purpose of maintaining an area surrounding a vehicular child seat at a constant desired temperature.

SUMMARY OF THE INVENTION

In view of the foregoing disadvantages inherent in the known types of vehicular child seats now present in the prior art, the present invention provides a new vehicular child seat cover construction wherein the same can be utilized for maintaining an area surrounding a vehicular child seat at a constant desired temperature.

The general purpose of the present invention, which will be described subsequently in greater detail, is to provide a new vehicular child seat cover apparatus and method which has many of the advantages of the vehicular child seats mentioned heretofore and many novel features that result in a new vehicular child seat cover which is not anticipated, rendered obvious, suggested, or even implied by any of the prior art vehicular child seats, either alone or in any combination thereof.

To attain this, the present invention generally comprises a cover constructed from an air permeable, flexible, elastic material. The cover includes an open rear with a rectangular configuration defined by a short top edge, a short bottom edge, and a pair of elongated side edges. The edges of the open rear are lined with a continuous elastic band. Next provided is a plurality of resilient rods each coupled along a length thereof to an inner surface of the cover. Such rods includes a plurality of longitudinal rods each having a top end positioned adjacent to and spaced from a central extent of the top edge of the open rear of the cover. Note FIGS. 2 & 4. As shown, the longitudinal rods extends radially with a first radius of curvature such that the longitudinal rods each reside in separate vertical planes which form acute angles with respect to each other. The rods further include lateral rods each having ends positioned adjacent to and spaced from the side edges of the open rear of the cover. The lateral rods have a second radius of curvature less than the first radius of curvature. As shown in FIG. 1, the lateral rods reside in separate planes which form acute angles with respect to each other. In use, the rods maintain the cover in an erected orientation. As such, the cover is defined by a substantially planar square bottom face, a substantially planar rectangular rear face with the open rear centered therein and spaced from a periphery thereof, and a bulbous front face. An enclosed space is thus formed which is adapted for housing the vehicular child seat therein. As best shown in FIG. 3, three thin elongated strips are included which are constructed from a flexible inelastic material. Such strips each have a bottom end coupled to the bottom edge of the open rear of the cover. A top end of each strip has a snap fastener mounted thereon for snappily coupling with a snap fastener mounted on the top face of the cover. Ideally, the snap fastener is positioned adjacent to the rear face thereof such that the strips remain in parallel relationship.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular child seat cover apparatus and method which has many of the advantages of the vehicular child seats mentioned heretofore and many novel features that result in a new vehicular child seat cover which is not anticipated, rendered obvious, suggested, or even implied by any of the prior art vehicular child seats, either alone or in any combination thereof.

It is another object of the present invention to provide a new vehicular child seat cover which may be easily and efficiently manufactured and marketed.

It is a further object of the present invention to provide a new vehicular child seat cover which is of a durable and reliable construction.

An even further object of the present invention is to provide a new vehicular child seat cover which is susceptible of a low cost of manufacture with regard to both materials and labor, and which accordingly is then susceptible of low prices of sale to the consuming public, thereby making such vehicular child seat cover economically available to the buying public.

Still yet another object of the present invention is to provide a new vehicular child seat cover which provides in the apparatuses and methods of the prior art some of the advantages thereof, while simultaneously overcoming some of the disadvantages normally associated therewith.

Still another object of the present invention is to provide a new vehicular child seat cover for maintaining an area surrounding a vehicular child seat at a constant desired temperature.

Even still another object of the present invention is to provide a new vehicular child seat cover that includes a cover and a plurality of rods each coupled to the cover for maintaining the same in an erected orientation. The cover defines an enclosed space adapted for housing a vehicular child seat therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new vehicular child seat cover according to the present invention.

FIG. 2 is a front view of the present invention.

DESCRIPTION OF THE PREFERRED EMBODIMENT

Figure 3:
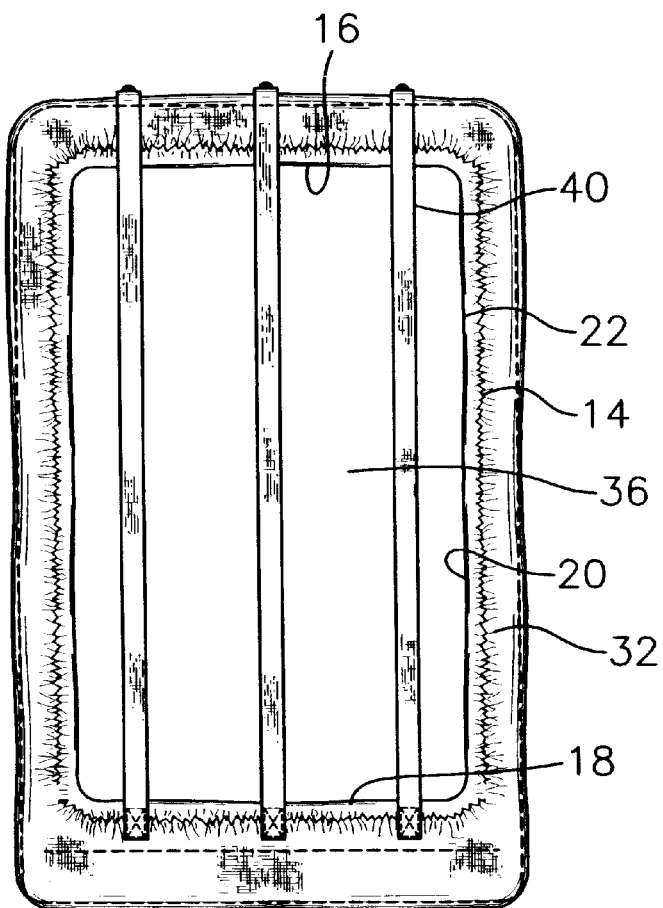
FIG. 3 is a rear view of the present invention.
Figure 4:
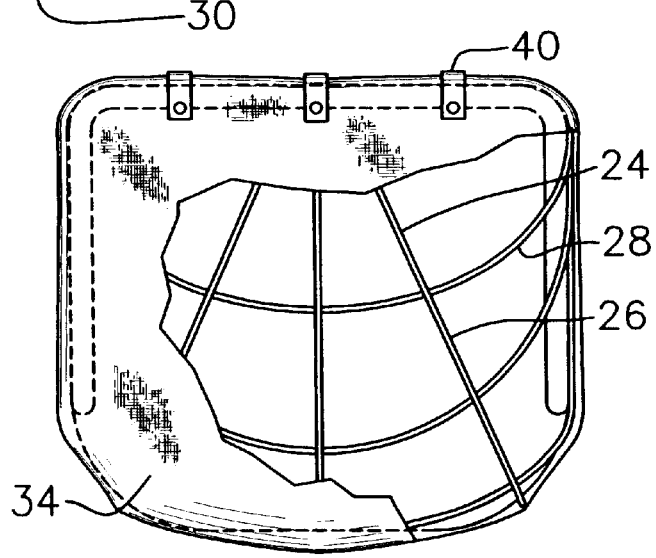
FIG. 4 is a top view of the present invention.

With reference now to the drawings, and in particular to FIGS. 1 through 4 thereof, a new vehicular child seat cover embodying the principles and concepts of the present invention and generally designated by the reference numeral 10 will be described.

The present invention, designated as numeral 10, includes a lightly colored cover 12 constructed from an air permeable, flexible, elastic, and insulated material. The cover includes an open rear 14 with a rectangular configuration defined by a short top edge 16, a short bottom edge 18, and a pair of elongated side edges 20. The edges of the open rear are lined with a continuous elastic band 22.

Next provided is a plurality of resilient rods 24 each coupled along a length thereof to an inner surface of the cover. Such rods includes a plurality of longitudinal rods 26 each having a top end positioned adjacent to and spaced from a central extent of the top edge of the open rear of the cover. Note FIGS. 2 & 4. As shown, the longitudinal rods extends radially such that the bottom ends thereof are spaced with respect to each other. As shown in the FIG. 2, such bottom ends are generally vertically oriented while the top ends are generally horizontally oriented. The longitudinal rods are each equipped with a first radius of curvature. In use, the longitudinal rods each reside in separate vertical planes which form acute angles with respect to each other.

The rods further include lateral rods 28 each having ends positioned adjacent to and spaced from the side edges of the open rear of the cover. The lateral rods have a second radius of curvature less than the first radius of curvature. As shown in FIG. 1, the lateral rods reside in separate planes which form acute angles with respect to each other. As shown in FIG. 1, a bottommost one of the lateral rods resides in a horizontal plane. Further, the ends of the lateral rods are directed rearwardly.

In use, the rods maintain the cover in an erected orientation. As such, the cover is defined by a substantially planar square bottom face 30, a substantially planar rectangular rear face 32 with the open rear centered therein and spaced from a periphery thereof, and a bulbous front face 34. An enclosed space 36 is thus formed which is adapted for housing a vehicular child seat 38 therein.

As best shown in FIG. 3, three thin elongated strips 40 are included which are constructed from a flexible inelastic material. Such strips each have a bottom end coupled to the bottom edge of the open rear of the cover. A top end of each strip has a snap fastener mounted thereon for snappily coupling with a snap fastener 42 mounted on the top face of the cover. Ideally, the snap fastener is positioned adjacent to the rear face of the cover such that the strips remain in parallel relationship.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicular child seat cover for use with a vehicular child seat including a back portion and a seat portion, the cover comprising, in combination:

a cover constructed from an air permeable, flexible, elastic material and including an open rear with a rectangular configuration defined by a short top edge, a short bottom edge, and a pair of elongated side edges, the edges of the open rear being lined with a continuous elastic band;

a plurality of resilient rods each coupled along a length thereof to an inner surface of the cover, the rods including a plurality of longitudinal rods each having a top end positioned adjacent to and spaced from a central extent of the top edge of the open rear of the cover and extending radially therefrom with a first radius of curvature such that the longitudinal rods each reside in separate vertical planes which form acute angles with respect to each other, the rods further including lateral rods each including ends positioned adjacent to and spaced from the side edges of the open rear of the cover and having a second radius of curvature less than the first radius of curvature, wherein the lateral rods reside in separate planes which form acute angles with respect to each other;

said rods maintaining the cover in an erected orientation wherein the cover is defined by a substantially planar square bottom face, a substantially planar rectangular rear face with the open rear centered therein and spaced from a periphery thereof, and a bulbous front face, thereby defining an enclosed space adapted for housing the vehicular child seat therein; and three thin elongated strips constructed from a flexible inelastic material and having a bottom end coupled to the bottom edge of the open rear of the cover and a top end having a snap fastener mounted thereon for snappily coupling with a snap fastener mounted on the top face of the cover adjacent to the rear face thereof such that the strips remain in parallel relationship.

2. A vehicular child seat cover comprising, in combination:

a cover;

a plurality of rods each coupled to the cover for maintaining the same in an erected orientation, the rods including longitudinal rods each having a top end positioned adjacent to a central extent of the cover and extending radially therefrom;

wherein the cover defines an enclosed space adapted for housing a vehicular child seat therein.

3. A vehicular child seat cover as set forth in claim 2 wherein the rods reside in separate vertical planes which form acute angles with respect to each other.

4. A vehicular child seat cover as set forth in claim 2 wherein the rods include a plurality of lateral rods each having ends positioned along side edges of the cover.

5. A vehicular child seat cover as set forth in claim 4 wherein the lateral rods reside in separate planes which form acute angles with respect to each other.

6. A vehicular child seat cover as set forth in claim 2 wherein the cover defines a rear opening.

7. A vehicular child seat cover as set forth in claim 6 wherein the rear opening is lined with an elastic band.

8. A vehicular child seat cover as set forth in claim 6 wherein a plurality of strips are coupled to a periphery of the rear opening.

9. A vehicular child seat cover as set forth in claim 2 wherein the cover is constructed from an insulated, air permeable, flexible, elastic material.

10. A vehicular child seat cover comprising, in combination:

a cover, the cover defining a rear opening;

a plurality of strips coupled to a periphery of the rear opening;

a plurality of rods each coupled to the cover for maintaining the same in an erected orientation;

wherein the cover defines an enclosed space adapted for housing a vehicular child seat therein.

11. A vehicular child seat cover as set forth in claim 10 wherein the rods reside in separate vertical planes which form acute angles with respect to each other.

12. A vehicular child seat cover as set forth in claim 10 wherein the rods include a plurality of lateral rods each having ends positioned along side edges of the cover.

13. A vehicular child seat cover as set forth in claim 12 wherein the lateral rods reside in separate planes which form acute angles with respect to each other.

14. A vehicular child seat cover as set forth in claim 10 wherein the rear opening is lined with an elastic band.

15. A vehicular child seat cover as set forth in claim 10 wherein the cover is constructed from an insulated, air permeable, flexible, elastic material.

* * * * *